(12) United States Patent
Kuo et al.

(10) Patent No.: US 8,508,496 B2
(45) Date of Patent: Aug. 13, 2013

(54) TOUCH DISPLAY, LIQUID CRYSTAL DISPLAY WITH A BUILT-IN TOUCH PANEL

(75) Inventors: Chien-Chung Kuo, Taichung County (TW); Chun-Chi Chi, Taichung County (TW)

(73) Assignee: Wintek Corporation, Taichung (TW)

( * ) Notice: Subject to any disclaimer, the term of this patent is extended or adjusted under 35 U.S.C. 154(b) by 813 days.

(21) Appl. No.: 12/393,047

(22) Filed: Feb. 26, 2009

(65) Prior Publication Data
US 2009/0213092 A1    Aug. 27, 2009

(30) Foreign Application Priority Data

Feb. 26, 2008   (TW) .............................. 97106638 A

(51) Int. Cl.
   *G06F 3/045*   (2006.01)
(52) U.S. Cl.
   USPC ........................................................ 345/174
(58) Field of Classification Search
   USPC ........................................ 345/173, 174, 87
   See application file for complete search history.

(56) References Cited

U.S. PATENT DOCUMENTS

| | | | |
|---|---|---|---|
| 5,579,036 A | | 11/1996 | Yates, IV |
| 5,631,805 A | | 5/1997 | Bonsall |
| 6,020,945 A | * | 2/2000 | Sawai et al. .................. 349/119 |
| 6,570,707 B1 | * | 5/2003 | Murakami et al. ....... 359/489.07 |
| 7,084,933 B2 | | 8/2006 | Oh et al. |
| 2003/0222857 A1 | * | 12/2003 | Abileah ........................ 345/173 |
| 2008/0030484 A1 | * | 2/2008 | Cho et al. ...................... 345/176 |
| 2008/0055270 A1 | * | 3/2008 | Cho et al. ...................... 345/173 |
| 2008/0180407 A1 | * | 7/2008 | Utsunomiya et al. ......... 345/174 |
| 2009/0096761 A1 | * | 4/2009 | Cho ............................. 345/174 |

FOREIGN PATENT DOCUMENTS

CN    1675580    9/2005

OTHER PUBLICATIONS

"1st Office Action of China Counterpart Application" issued on Feb. 5, 2010, p. 1-p. 4.

* cited by examiner

*Primary Examiner* — Adam R Giesy
(74) *Attorney, Agent, or Firm* — Jianq Chyun IP Office

(57) ABSTRACT

A liquid crystal display (LCD) with a built-in touch panel includes an LCD unit, a touch panel and a second polarized plate. The LCD unit includes a lower substrate, an upper substrate, a liquid crystal layer and a first polarized plate. The upper substrate is disposed opposite to the lower substrate, and the liquid crystal layer is disposed between the lower substrate and the upper substrate. The first polarized plate is disposed on the lower substrate and has a first polarized direction. The touch panel is disposed opposite to the LCD unit. The second polarized plate having a second polarized direction is disposed on the touch panel and located between the LCD unit and the touch panel. An intensity of a reflected light occurred in the LCD with the built-in touch panel is relatively low, so that good contrast and visibility are obtained.

8 Claims, 10 Drawing Sheets

TOUCH DISPLAY, LIQUID CRYSTAL DISPLAY WITH A BUILT-IN TOUCH PANEL

CROSS-REFERENCE TO RELATED APPLICATION

This application claims the priority benefit of Taiwan application serial no. 97106638, filed on Feb. 26, 2008. The entirety of the above-mentioned patent application is hereby incorporated by reference herein and made a part of this specification.

BACKGROUND OF THE INVENTION

1. Field of the Invention

The present invention relates to a touch display. More particularly, the present invention relates to a liquid crystal display (LCD) with a built-in touch panel having a good contrast and visibility.

2. Description of Related Art

FIG. 1 is a schematic diagram of a conventional LCD with a built-in touch panel. Referring to FIG. 1, the LCD 100 with a built-in touch panel includes an LCD panel 110 and a touch panel 120. The LCD panel 110 includes a first polarized plate 111, a lower substrate 112, an active device array 113, a liquid crystal layer 114, a common electrode layer 115, an upper substrate 116 and a second polarized plate 117. The touch panel 120 includes a first substrate 121, a lower electrode 122, a dielectric layer 123, an upper electrode 124 and a second substrate 125. Particularly, the touch panel 120 and the LCD panel 110 are adhered together via a double-sided adhesive 130. However, the double-sided adhesive 130 is only attached to peripheries of the LCD panel 110 and the touch panel 120. Therefore, an air layer 140 may be existed between the touch panel 120 and the LCD panel 110. Ambient lights (not shown) may be reflected by the air layer 140, which may lead to a decrease of contrast and visibility of the LCD panel 110.

FIG. 2 is a schematic diagram of another conventional LCD with a built-in touch panel. Referring to FIG. 2, the LCD 102 with a built-in touch panel is approximately the same as the LCD 100 with a built-in touch panel, and like reference numerals refer to the like elements throughout. The difference there between is that in the LCD 102 with a built-in touch panel, the LCD panel 110 and the touch panel 120 are adhered together via an optical adhesive 150. Since the optical adhesive 150 is fully coated between the LCD panel 110 and the touch panel 120, the LCD 102 with a built-in touch panel may not have a problem of interface reflection, and may have a good display effect. However, the optical adhesive 150 may have a poor reliability after long time utilization. Moreover, during assembling, air bubbles may be generated in the optical adhesive 150, which may lead to an abnormal scattering of light. Furthermore, utilization of the optimal adhesive 150 may have a problem of excessive overall thickness, and is uneasy to rework when sticking quality thereof is poor. More particularly, if the touch panel 120 is damaged and the LCD panel 110 functions well, it is difficult to replace the touch panel 120.

FIG. 3 is a schematic diagram of still another conventional LCD with a built-in touch panel. Referring to FIG. 3, the LCD 104 with a built-in touch panel is approximately the same as the LCD 100 with a built-in touch panel, and like reference numerals refer to the like elements. The difference there between is that the LCD 104 with a built-in touch panel includes an antireflection film 160 disposed at a side of the touch panel 120 facing to the LCD panel 110, and the LCD panel 110 and the touch panel 120 are still adhered together via the double-sided adhesive 130. Therefore, the problem of the interface reflection of the LCD 104 with a built-in touch panel may be avoided, and reworking capability thereof is rather good.

However, cost of the antireflection film 160 is relatively high. Moreover, during assembling of the antireflection film 160, problem of contamination or poor adhesion of the antireflection film 160 caused by peripheral adhesive residues (not shown) may occur.

SUMMARY OF THE INVENTION

Accordingly, the present invention is directed to an LCD with a built-in touch panel, which has good contrast and visibility.

The present invention is directed to a touch display having good contrast and visibility.

Accordingly, the present invention provides an LCD with a built-in touch panel including an LCD unit, a touch panel and a second polarized plate. The LCD unit includes a lower substrate, an upper substrate, a liquid crystal layer and a first polarized plate. The upper substrate is disposed opposite to the lower substrate, and the liquid crystal layer is disposed between the lower substrate and the upper substrate. The first polarized plate is disposed on the lower substrate. The touch panel is disposed opposite to the upper substrate. The second polarized plate is disposed at a side of the touch panel facing to the LCD unit, and is located between the LCD unit and the touch panel.

In an embodiment of the present invention, the LCD with a built-in touch panel further includes an airtight gasket disposed between the upper substrate and the second polarized plate. The airtight gasket surrounds a space between the touch panel and the LCD unit, and an air layer is existed in the space.

In an embodiment of the present invention, the LCD with a built-in touch panel further includes a quarter-wavelength plate disposed on the second polarized plate and located between the second polarized plate and the LCD unit.

In an embodiment of the present invention, the LCD with a built-in touch panel further includes a common electrode layer and a color filter array layer. The common electrode layer is disposed on the upper substrate and located between the upper substrate and the liquid crystal layer. The color filter array layer is disposed on the upper substrate and located between the upper substrate and the common electrode layer.

In an embodiment of the present invention, the LCD with a built-in touch panel further includes an active device array disposed on the lower substrate.

In an embodiment of the present invention, the touch panel includes a resistive touch panel, a capacitive touch panel, an ultrasonic touch panel, or an optical touch panel.

In an embodiment of the present invention, the touch panel includes a first substrate, a first electrode pattern, a dielectric layer, a second electrode pattern and a second substrate. The first electrode pattern is disposed on the first substrate. The second substrate is disposed opposite to the first substrate. The second electrode pattern is disposed on the second substrate, and the dielectric layer is disposed between the first electrode pattern and the second electrode pattern.

In an embodiment of the present invention, the touch panel includes a first substrate, a first electrode pattern, a dielectric layer, a second electrode pattern and a second substrate. The first electrode pattern is disposed on the first substrate. The second substrate is disposed opposite to the first substrate. The second electrode pattern is disposed on the second substrate, and the dielectric layer is disposed between the first electrode pattern and the second electrode pattern.

Accordingly, the present invention further provides a touch display including a display unit, a touch panel and a polarized plate. The touch panel is disposed opposite to the display unit. The polarized plate is disposed on the touch panel, and is located between the display unit and the touch panel.

In an embodiment of the present invention, the touch display further includes a quarter-wavelength plate disposed on the polarized plate and located between the polarized plate and the display unit.

According to the touch display of the present invention, by setting the polarized plate at a side of the touch panel facing to the display unit, intensity of reflected light may be weakened and the contrast of the displayed image may be improved. More particularly, since the second polarized plated is set on the touch panel, not only the LCD with a built-in touch panel may normally display images, but also intensity of the light reflected by the air layer may be reduced. Moreover, by applying the second polarized plate and the quarter-wavelength plate, interference caused by the reflected light may be completely eliminated. Therefore, the LCD with a built-in touch panel may provide images with a good contrast and visibility.

In order to make the aforementioned and other objects, features and advantages of the present invention comprehensible, a preferred embodiment accompanied with figures is described in detail below.

DESCRIPTION OF EMBODIMENTS

Figure 4:
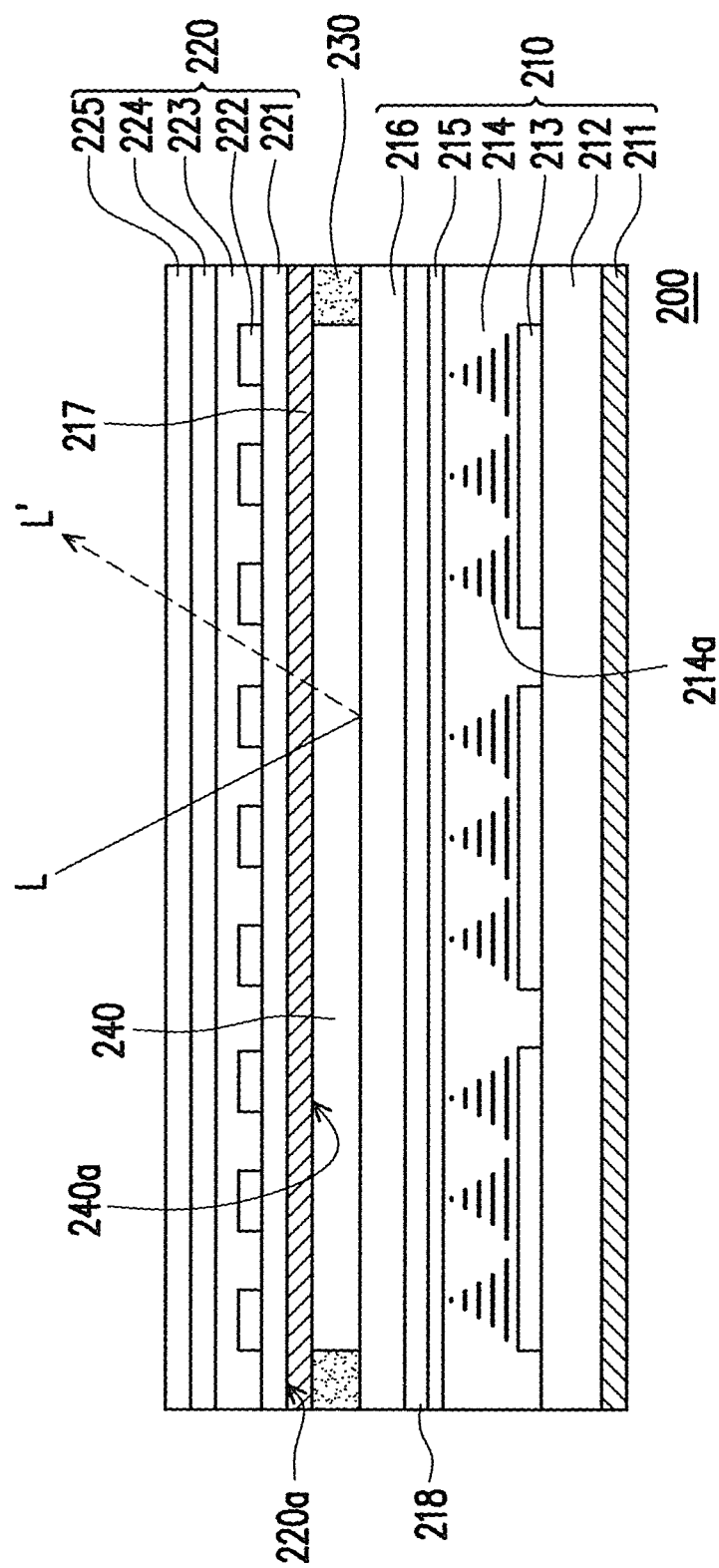
FIG. 4 is a schematic diagram illustrating an LCD with a built-in touch panel according to a preferred embodiment of the present invention.

FIG. 4 is a schematic diagram illustrating an LCD with a built-in touch panel according to a preferred embodiment of the present invention. Referring to FIG. 4, the LCD 200 with a built-in touch panel includes an LCD unit 210, a touch panel 220 and a second polarized plate 217. The LCD unit 210 includes a lower substrate 212, an upper substrate 216, a liquid crystal layer 214 and a first polarized plate 211. The upper substrate 216 is disposed opposite to the lower substrate 212. The liquid crystal layer 214 is disposed between the lower substrate 212 and the upper substrate 216. The first polarized plate 211 is disposed on the lower substrate 212. The touch panel 220 is disposed opposite to the upper substrate 216. The second polarized plate 217 is disposed at a side 220a of the touch panel 220 facing to the LCD unit 210, and is located between the LCD unit 210 and the touch panel 220.

In an embodiment, the first polarized plate 211 has a first polarized direction, and the second polarized plate 217 has a second polarized direction, wherein the first polarized direction is perpendicular to the second polarized direction. Certainly, the first polarized direction and the second polarized direction may also be not perpendicular with each other, which is not limited thereto by the present embodiment.

Referring to FIG. 4 again, the LCD 200 with a built-in touch panel may further include a common electrode layer 215 disposed on the upper substrate 216 and located between the upper substrate 216 and the liquid crystal layer 214. Moreover, the LCD 200 with a built-in touch panel may further include an active device array 213 disposed on the lower substrate 212. Under function of an electric field formed between the common electrode layer 215 and the active device array 213, liquid molecules 214a within the liquid crystal layer 214 may be driven to rotate, so that the LCD unit 210 may implement a display effect. Moreover, the LCD 200 with a built-in touch panel may further include a color filter array layer 218 disposed on the upper substrate 216 and located between the upper substrate 216 and the common electrode layer 215.

Referring to FIG. 4 again, the touch panel 220 may be a capacitive touch panel including a first substrate 221, a first electrode pattern 222, a dielectric layer 223, a second electrode pattern 224 and a second substrate 225. The first electrode pattern 222 is disposed on the first substrate 221. The second substrate 225 is disposed opposite to the first substrate 221. The second electrode pattern 224 is disposed on the second substrate 225. The dielectric layer 223 is disposed between the first electrode pattern 222 and the second electrode pattern 224. When the touch panel 220 is pressed, an operation signal is induced between the first electrode pattern 222 and the second electrode pattern 224, so as to perform information input. However, the type of the touch panel 220 is not limited by the present invention, and the touch panel 220 may also be a resistive touch panel, an ultrasonic touch panel or an optical touch panel.

It should be noted that the LCD 200 with a built-in touch panel further includes an airtight gasket 230 disposed between the upper substrate 216 and the second polarized plate 217. The airtight gasket 230 surrounds a space 240a between the touch panel 220 and the LCD unit 210, and an air layer 240 is existed in the space 240a. The airtight gasket 230 is used for assembling the touch panel 220 and the LCD unit 210, and may facilitate reworking of the LCD 200 with a built-in tough panel. Namely, if the LCD unit 210 still functions well, replacement of the touch panel 220 is relatively easy. However, since the air layer 240 is existed in the space 240a, light L incident to the LCD 200 with a built-in touch panel may be reflected by the air layer 240.

It should be noted that the light L is composed of two vectors of light respectively with a perpendicular polarized direction and a horizontal polarized direction. Since the second polarized plate 217 has a second polarized direction, theoretically, only light L' within the light L having a polarized direction thereof being the same as the second polarized direction may pass there through. Therefore, intensity of the light L' is about 50% compared to that of the light L. Accordingly, by setting the second polarized plate 217 to a side 220a of the touch panel 220 facing to the LCD unit 210, intensity of the reflected light L' may be effectively reduced, so as to provide a good contrast and visibility.

Figure 1:
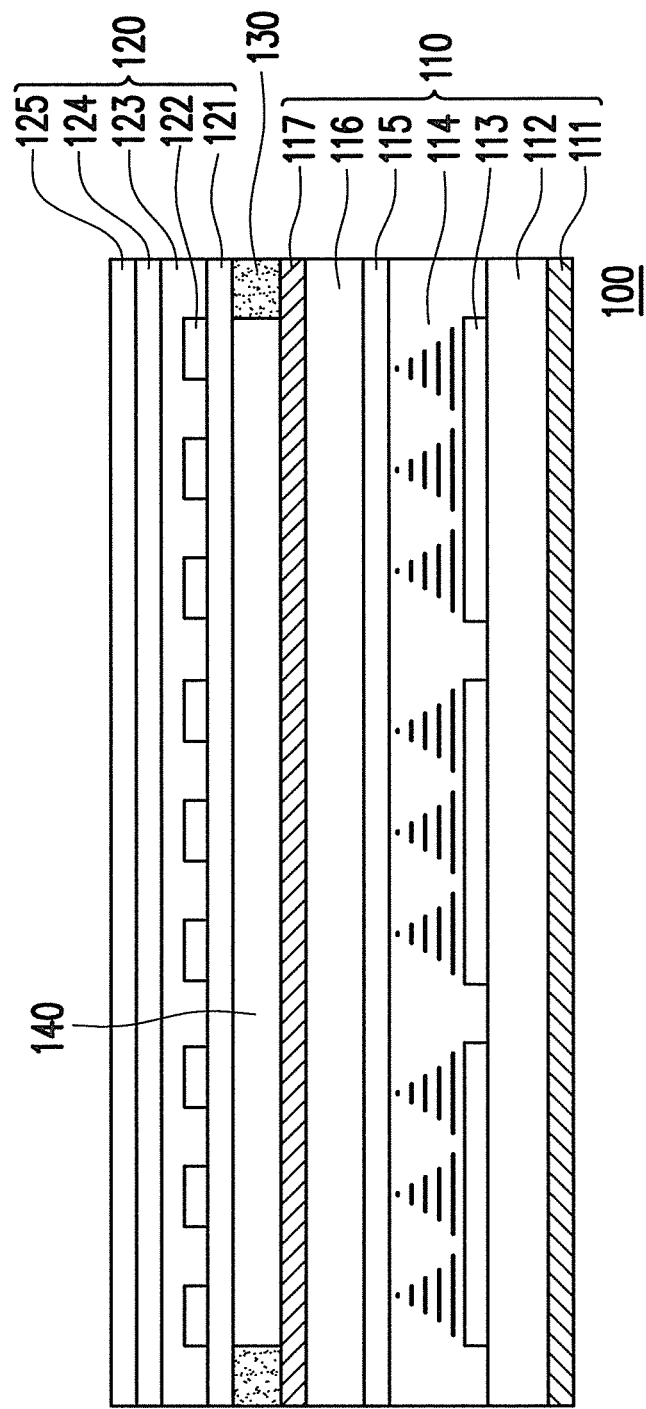
FIG. 1 is a schematic diagram of a conventional LCD with a built-in touch panel.
Figure 2:
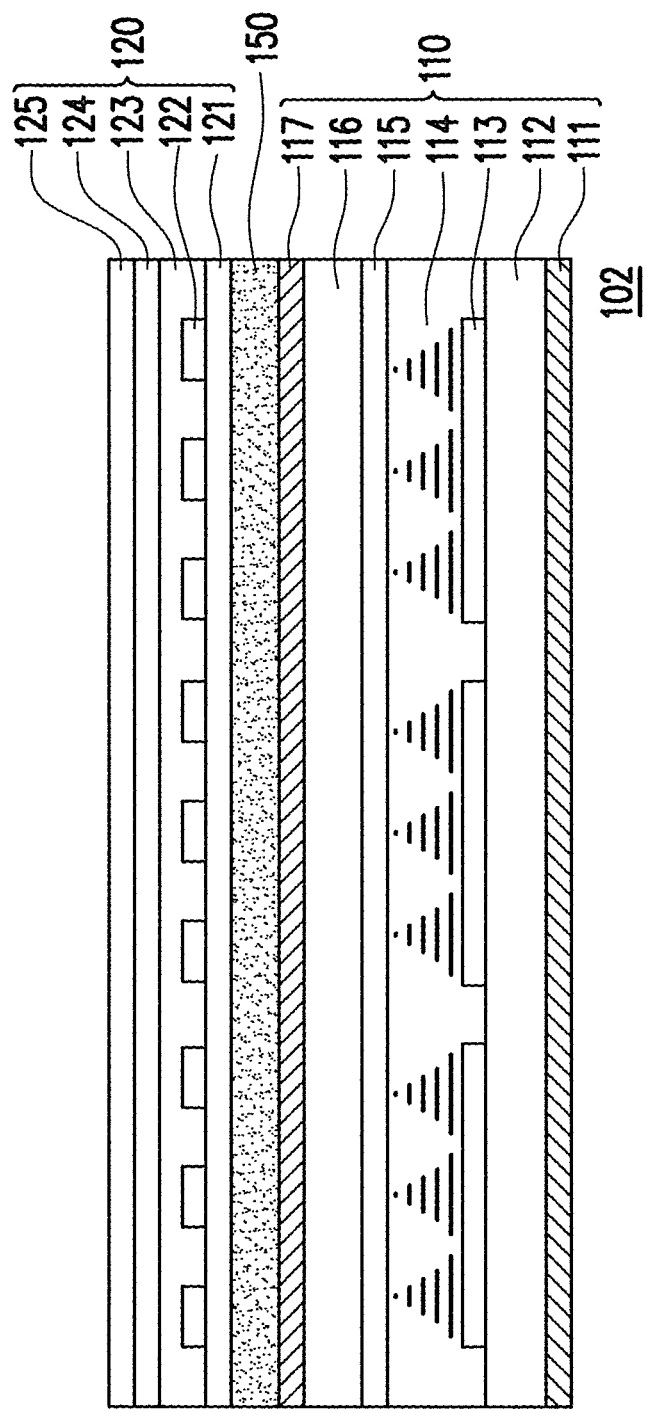
FIG. 2 is a schematic diagram of another conventional LCD with a built-in touch panel.
Figure 3:
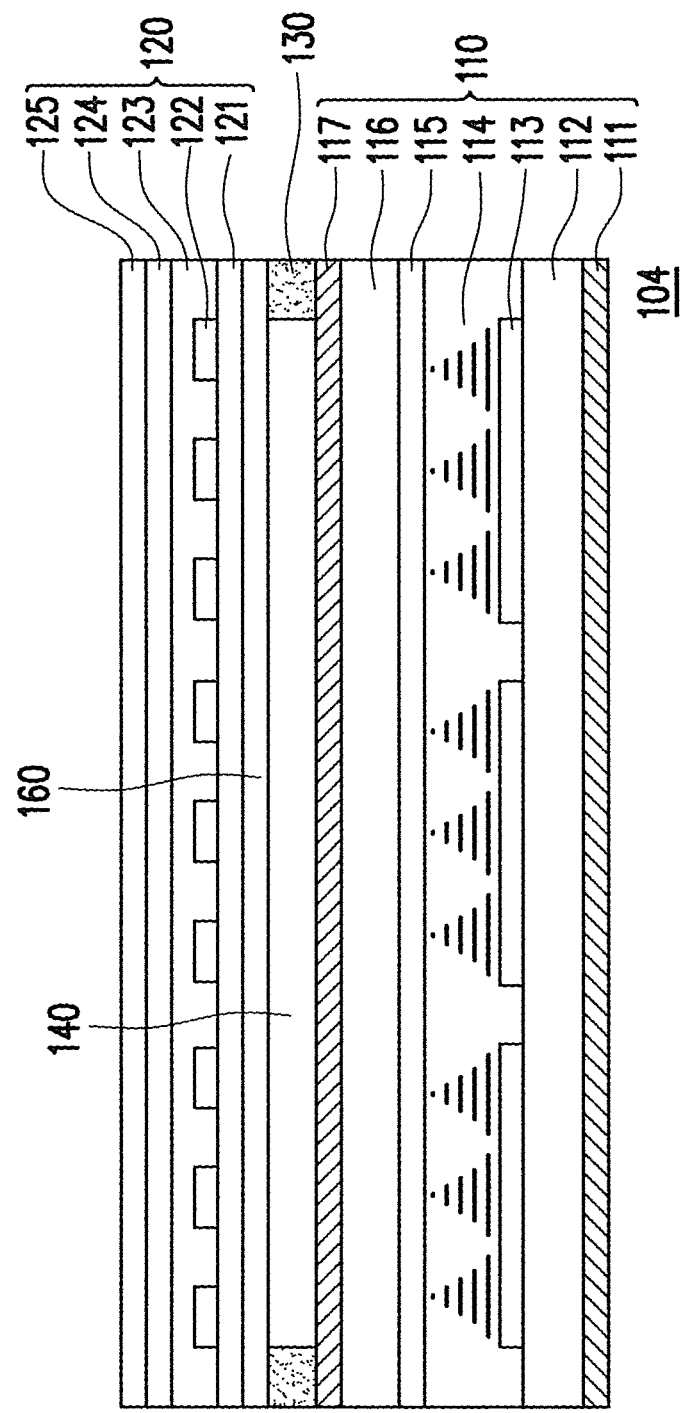
FIG. 3 is a schematic diagram of still another conventional LCD with a built-in touch panel.

It should be noted that by setting one of the two polarized plate included in the LCD unit 210 to the touch panel 220 (in the present embodiment, the second polarized plate 217 is set on the touch panel 220), not only the LCD 200 with a built-in touch panel may normally display images, but also reflection problem of the light L reflected by the air layer 240 may be further solved. To be specific, the problem of contrast decreasing due to reflection of the light L may be solved by only changing a setting position of the second polarized plate 217. Moreover, compared to a conventional technique of adhering the antireflection film 160 as shown in FIG. 3, number of devices utilized in the LCD 200 with a built-in touch panel is relatively less, and cost of the second polarized plate 217 is relatively low compared to that of the antireflection film 160, and therefore fabrication cost of the whole LCD 200 with a built-in touch panel may be reduced.

Figure 5:
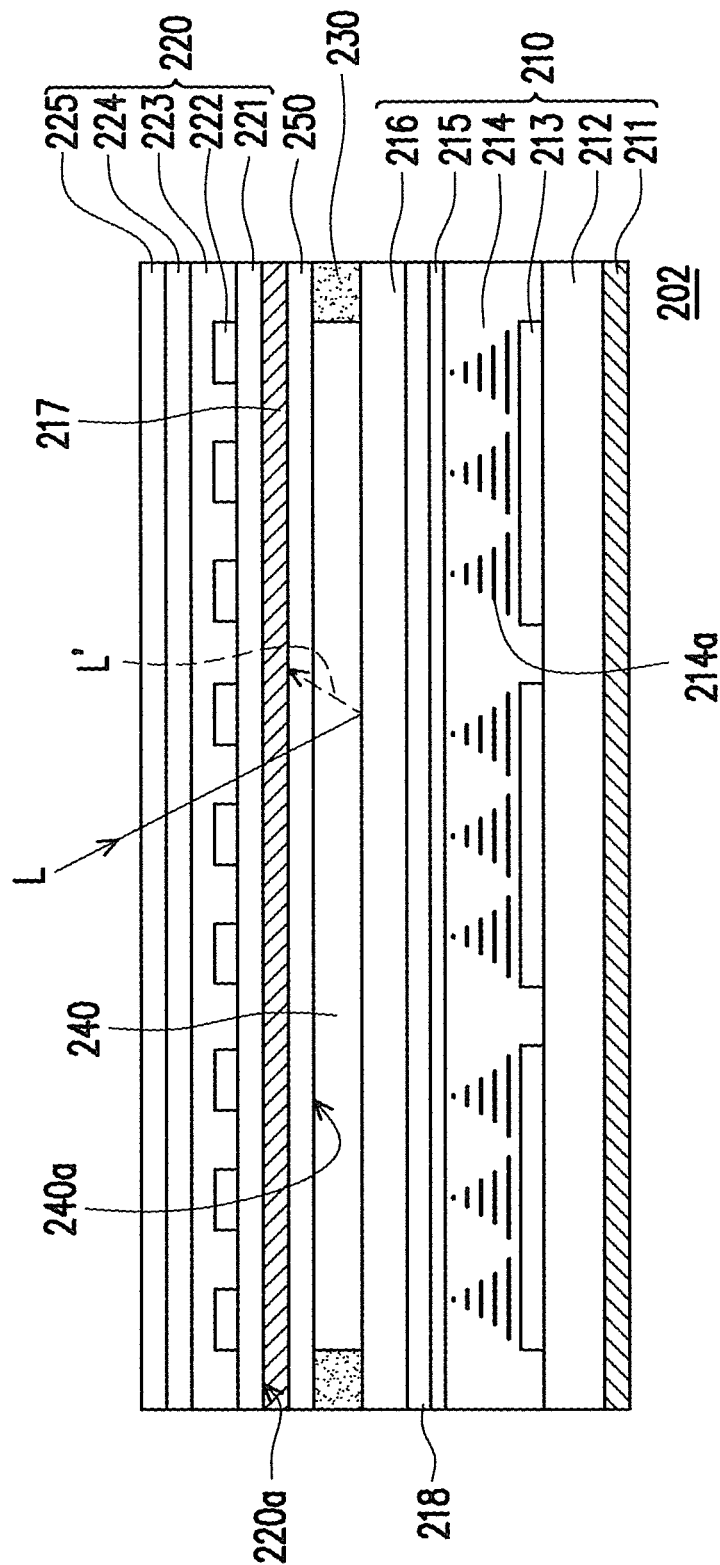
FIG. 5 is a schematic diagram illustrating another LCD with a built-in touch panel according to a preferred embodiment of the present invention.

FIG. 5 is a schematic diagram illustrating another LCD with a built-in touch panel according to a preferred embodiment of the present invention. Referring to FIG. 5, the LCD 202 with a built-in touch panel is similar to the LCD 200 with a built-in touch panel of FIG. 4, like reference numerals refer to the like elements throughout, and detailed structure thereof is not repeated.

The LCD 202 with a built-in touch panel of FIG. 5 further includes a quarter-wavelength plate 250 disposed on the second polarized plate 217 and located between the second polarized plate 217 and the LCD unit 210. By such means, the second polarized plate 217 and the quarter-wavelength plate 250 may form a circular polarized plate. Based on an optical polarization principle, after the light L is incident to the second polarized plate 217 and the quarter-wavelength plate 250, the light L is reflected by the air layer 240 and forms light L'. After the light L' passes through the quarter-wavelength plate 250, a polarized direction thereof is perpendicular to that of the second polarized plate 217, and therefore the light L' cannot emit out. Thus, decrease in the contrast caused by the reflected light L' may be further resolved.

Figure 6A:
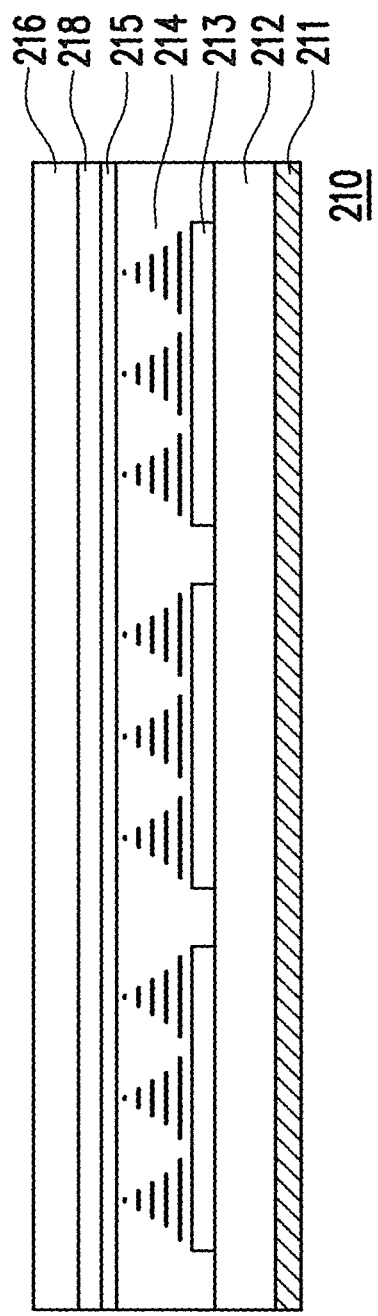
FIGS. 6A~6C is a flowchart illustrating a method for fabricating an LCD with a built-in touch panel according to a preferred embodiment of the present invention.
Figure 6B:
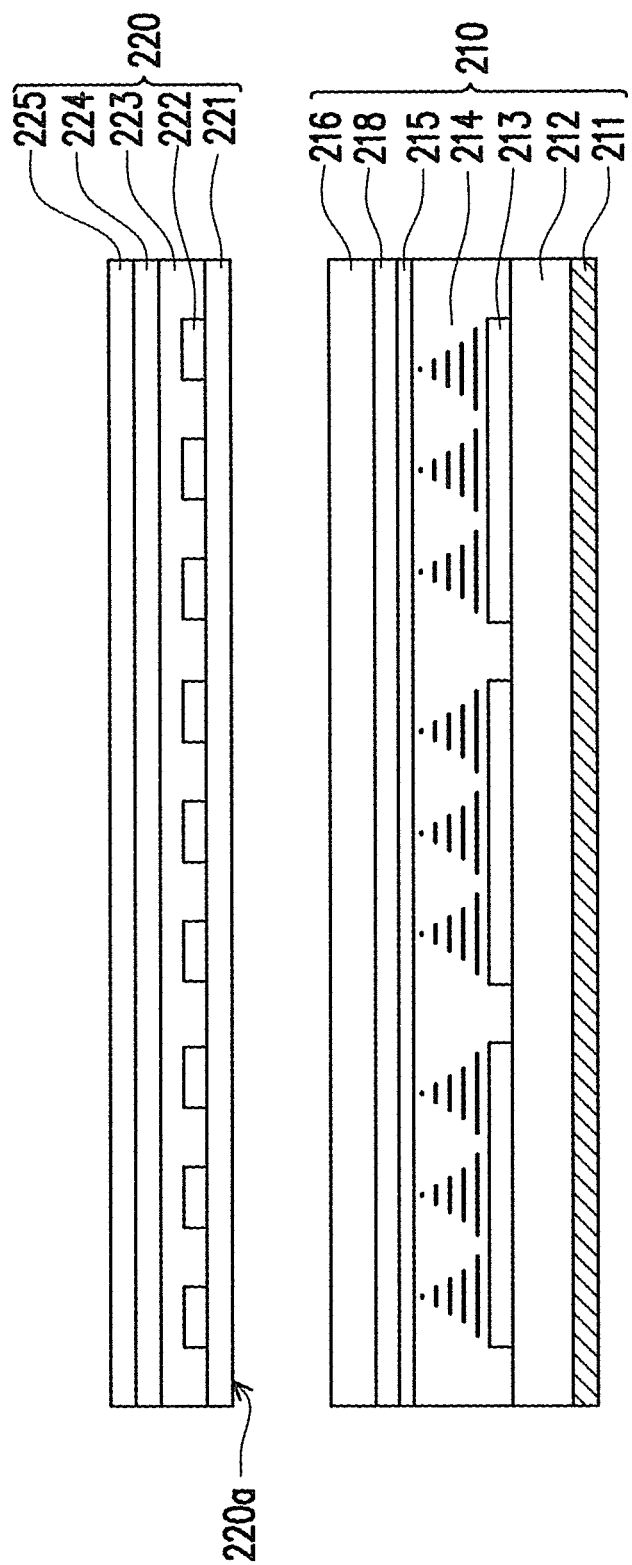
Figure 6C:
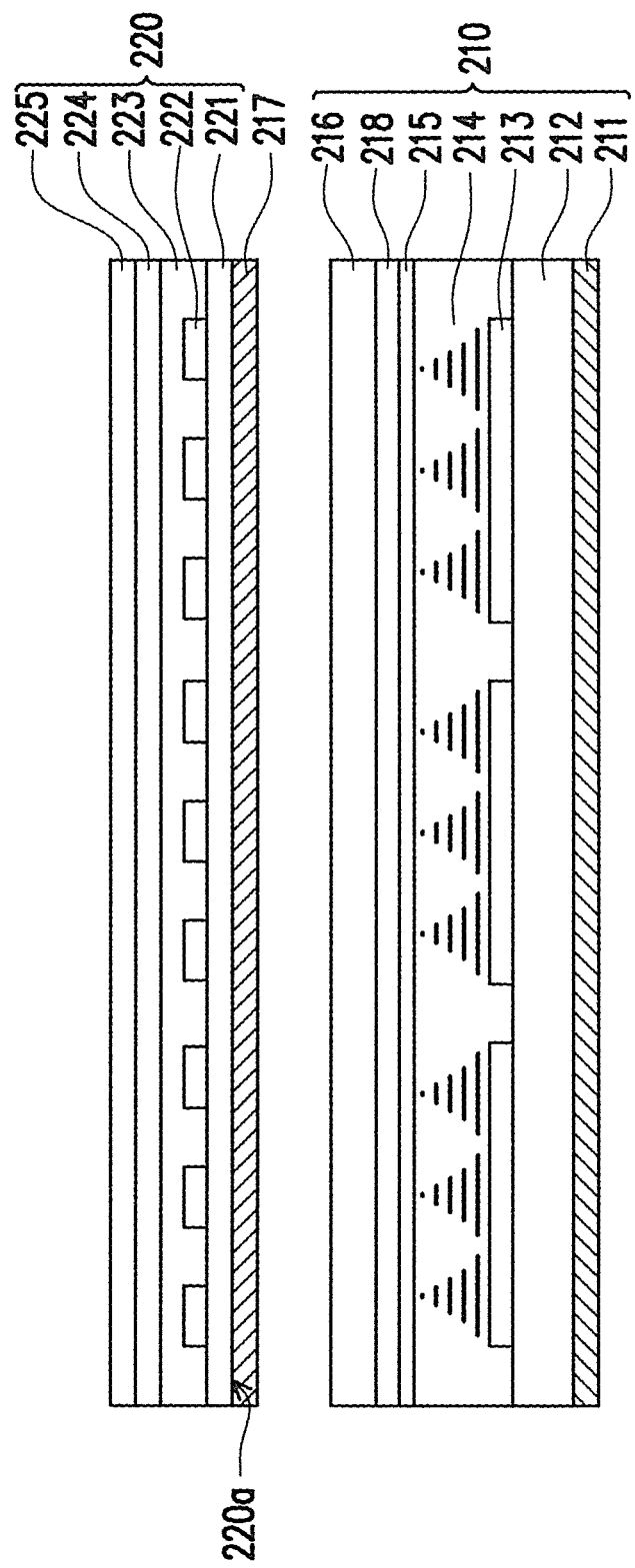

FIGS. 6A~6C are flowcharts illustrating a method for fabricating an LCD with a built-in touch panel according to a preferred embodiment of the present invention. First, referring to FIG. 6A, an LCD unit 210 including a lower substrate 212, an upper substrate 216 disposed opposite to the lower substrate 212, a liquid crystal layer 214 disposed between the lower substrate 212 and the upper substrate 216, and a first polarized plate 211 disposed on the lower substrate 212 is provided.

Referring to FIG. 6A again, a common electrode layer 215 may be further formed on the upper substrate 218, and may be located between the upper substrate 216 and the liquid crystal layer 214. The common electrode layer 215 may be formed based on sputtering deposition, and material of the common electrode layer 215 may be indium tin oxide or indium zinc oxide. Moreover, a color filter array layer 218 may be formed on the upper substrate 216, and may be disposed between the upper substrate 216 and the common electrode layer 215, the color filter array layer 218 may be formed based on a photolithographic process, an inkjet process or a printing process. Moreover, an active device array 213 may be formed on the lower substrate 212, and may be formed based on a conventional 5-mask process or an etching technique. Detailed structures of the above elements have been described in the aforementioned content, and therefore descriptions thereof will not be repeated.

Next, referring to FIG. 6B, a touch panel 220 for being disposed opposite to the LCD unit 210 is provided. Components of the touch panel 220 have been described in the aforementioned content, and therefore description thereof will not be repeated. More particularly, type of the touch panel 220 is not limited by the present invention, and the touch panel 220 may also be a resistive touch panel, a capacitive touch panel, an ultrasonic touch panel or an optical touch panel.

Next, referring to FIG. 6C, a second polarized plate 217 is provided. The second polarized plate 217 is disposed at a side 220a of the touch panel 220 facing to the LCD unit 210, and is located between the LCD unit 210 and the touch panel 220.

Next, the LCD unit 210, the touch panel 220 and the second polarized plate 217 are assembled to form the LCD 200 with a built-in touch panel shown as FIG. 4. In an embodiment, the first polarized plate 211 has the first polarized direction, the second polarized plate has the second polarized direction, and the first polarized direction is perpendicular to the second polarized direction. In another embodiment of the present invention, the first polarized direction may also be not perpendicular to the second polarized direction.

More particularly, an airtight gasket 230 may be further provided, which is disposed between the upper substrate 216 and the second polarized plate 217, and surrounds a space 240a between the touch panel 220 and the LCD unit 210, wherein an air layer 240 is existed in the space 240a. Moreover, in another embodiment, a quarter-wavelength plate 250 may further be provided, which is disposed on the second polarized plate 217 and located between the second polarized plate 217 and the LCD unit 210, as shown in FIG. 5.

Figure 7A:
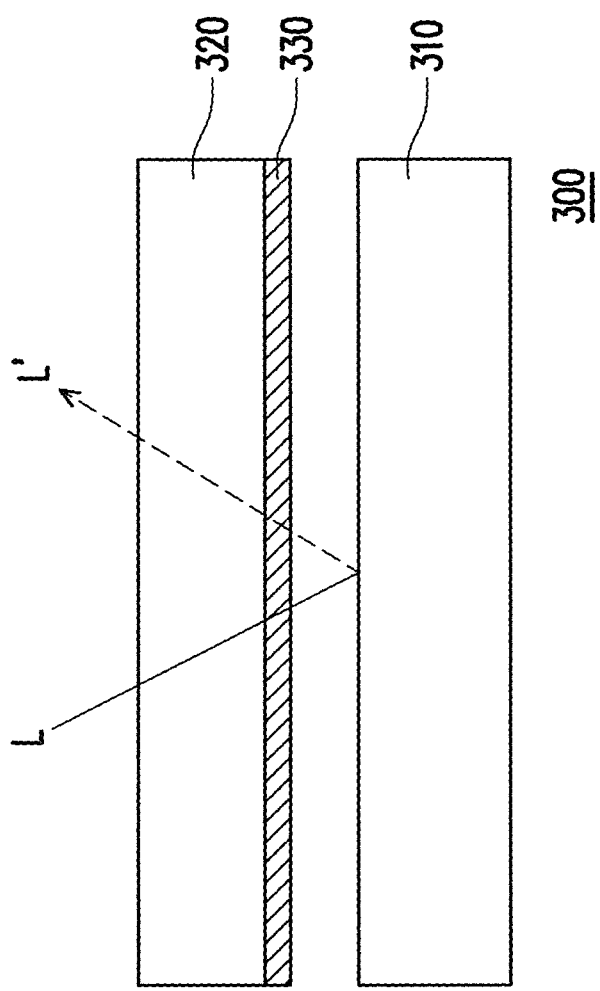
FIGS. 7A and 7B are schematic diagrams illustrating two kinds of touch displays with built-in touch panels according to a preferred embodiment of the present invention.
Figure 7B:
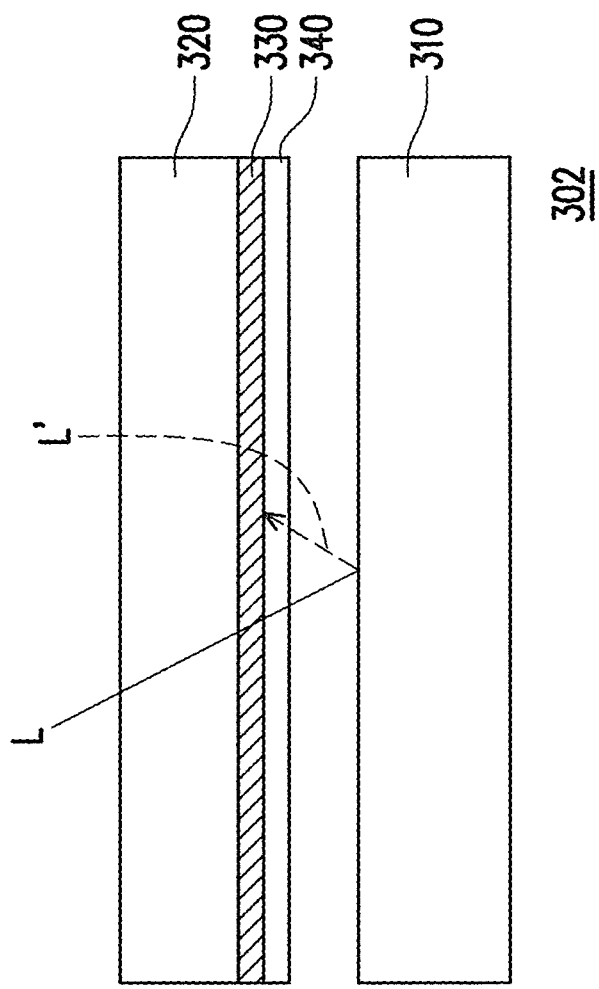

FIGS. 7A and 7B are schematic diagrams illustrating two kinds of touch displays with built-in touch panels according to a preferred embodiment of the present invention. Referring to FIG. 7A, the touch display 300 with a built-in touch panel includes a display unit 310, a touch panel 320 and a polarized plate 330. The touch panel 320 is disposed opposite to the display unit 310. The polarized plate 330 is disposed on the touch panel 320 and located between the display unit 310 and the touch panel 320.

The display unit 310 may be an LCD, an organic light emitting display (OLED), a plasma display panel (PDP) or any other type of display. The display unit 310 may also be a substrate having a printed pattern and is disposed on an electrical appliance for projecting a light with a specific pattern.

Referring to FIG. 7A again, similar to that of FIG. 4, after the light L is incident to the touch display 300 with a built-in touch panel, intensity of the reflected light L' may be decreased by the polarized plate 330, so that decrease in the contrast caused by the reflected light L' may be resolved.

Referring to FIG. 7B, the touch display 302 with a built-in touch panel of another embodiment further includes a quarter-wavelength plate 340 disposed on the polarized plate 330 and located between the polarized plate 330 and the LCD unit 310. Similar to that of FIG. 5, the polarized plate 330 and the quarter-wavelength plate 340 form a circular polarized plate, so that the light L' cannot be emitted out, and the display contrast may be improved.

In summary, the touch display with a built-in touch panel and the method for fabricating the touch display with a built-in touch panel of the present invention has at least the following advantages.

According to the touch display of the present invention, by setting the polarized plate at a side of the touch panel facing to the display unit, reflected light may be weakened and contrast of the displayed image may be improved. More particularly, since the second polarized plated is set on the touch panel, not only the LCD with a built-in touch panel may normally display images, but also intensity of the light reflected by the air layer may be reduced. Therefore, the LCD with a built-in touch panel may provide images with good contrast and visibility. Moreover, by applying the quarter-wavelength plate between the second polarized plate and the LCD unit, interference caused by the reflected light may be completely eliminated. By applying the airtight gasket for assembling the LCD unit and the touch panel, the LCD with a built-in touch panel is easy to be reworked. Moreover, since the number of devices utilized therein is relatively less, fabrication cost thereof is relatively low.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display (LCD) with a built-in touch panel, comprising:
    an LCD unit, comprising:
        a lower substrate;
        an upper substrate, disposed opposite to the lower substrate;
        a liquid crystal layer, disposed between the lower substrate and the upper substrate;
        a first polarized plate, disposed on the lower substrate;
    a touch panel, disposed opposite to the upper substrate;
    a second polarized plate, disposed at a side of the touch panel facing to the LCD unit, and located between the LCD unit and the touch panel; and
    an air layer configured between the upper substrate and the second polarized plate and an airtight gasket disposed at a periphery of the air layer surrounding the air layer,
    wherein the first polarized plate and the second polarized plate are the only polarizing plates in the liquid crystal display (LCD) with a built-in touch panel,
    the first polarized plate has a first polarized direction, and the second polarized plate has a second polarized direction, and the first polarized direction is matched with the second polarized direction for displaying an image and preventing light reflection.

2. The LCD with a built-in touch panel as claimed in claim 1, further comprising:
    a quarter-wavelength plate, disposed on the second polarized plate and located between the second polarized plate and the LCD unit.

3. The LCD with a built-in touch panel as claimed in claim 1, further comprising:
    a common electrode layer, disposed on the upper substrate and located between the upper substrate and the liquid crystal layer; and
    a color filter array layer, disposed on the upper substrate and located between the upper substrate and the common electrode layer.

4. The LCD with a built-in touch panel as claimed in claim 1, further comprising:
    an active device array, disposed on the lower substrate.

5. The LCD with a built-in touch panel as claimed in claim 1, wherein the touch panel comprises a resistive touch panel, a capacitive touch panel, an ultrasonic touch panel or an optical touch panel.

6. The LCD with a built-in touch panel as claimed in claim 1, wherein the touch panel comprises:
    a first substrate;
    a first electrode pattern, disposed on the first substrate;
    a second substrate, disposed opposite to the first substrate;
    a second electrode pattern, disposed on the second substrate; and
    a dielectric layer, disposed between the first electrode pattern and the second electrode pattern.

7. A touch display, comprising:
    a display unit, comprising a first polarized plate;
    a touch panel, disposed opposite to the display unit, and
    a second polarized plate, disposed on the touch panel and located between the display unit and the touch panel, and disposed at a side of the touch panel facing to the display unit; and
    an air layer configured between the display unit and the second polarized plate and an airtight gasket disposed at a periphery of the air layer surrounding the air layer;
    wherein the first polarized plate and the second polarized plate are the only polarizing plates in the display unit with a built-in touch panel,
    the first polarized plate has a first polarized direction, and the second polarized plate has a second polarized direction, and the first polarized direction is matched with the second polarized direction for displaying an image and preventing light reflection.

8. The touch display as claimed in claim 7, further comprising:
    a quarter-wavelength plate, disposed on the polarized plate and located between the second polarized plate and the display unit.

* * * * *